Figure 1:
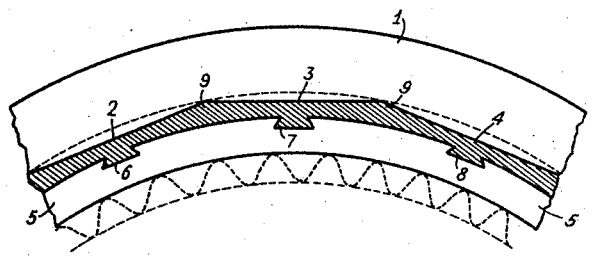

June 6, 1933.　　　F. SCHRÖTER　　　1,912,731

MIRROR WHEEL

Filed April 29, 1930

INVENTOR
FRITZ SCHRÖTER
BY
ATTORNEY

Patented June 6, 1933

1,912,731

UNITED STATES PATENT OFFICE

FRITZ SCHRÖTER, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

MIRROR WHEEL

Application filed April 29, 1930, Serial No. 448,321, and in Germany May 29, 1929.

This invention is particularly related to a method of and means for manufacturing mirror-equipped wheels for optical purposes, for instance, for cinematographic, television, and similar work.

The present invention is useful both for simple polyhedral mirrors in which the planes of all of the mirrors are positioned parallel to the axis of rotation, as well as for the so-called Weiller wheels in which the mirrors present an angle of inclination to the axis of rotation and one of increasingly greater value in order that the picture to be transmitted may be decomposed or scanned both in the sense of height and width during a single rotation of the wheel. In this latter case, however, it is suitable in practicing the present invention to so build the wheel that the inclination of the mirror planes to the axis of rotation is "unilateral".

The making of mirror wheels of the said sort has heretofore been attended with a great difficulty and a great deal of expense in connection with the setting of the mirror surfaces. If a clean screen shall be obtained, and if distortion of the picture is to be avoided, the setting of each mirror must be effected very painstakingly. One way of solving the problem was by screwing the mirrors, firmly cemented onto rigid carrier members, upon planar securing surfaces of the polyhedral body. The bearing surfaces of the supporting members were individually ground carefully until the correct and optically tested inclination of the mirrors in both directions was obtained.

The present invention discloses ways and means adapted to avoid such complicated manipulations and operation. It is a primary object of this invention to provide ways and means to permit the making of mirror-wheels of the kind here in question in a very cheap manner even when these mirror wheels are provided or equipped with relatively large numbers of mirrors.

The idea underlying the invention is that, while entirely avoiding securing screws and adjusting devices, the reflecting surfaces or minute mirrors are made to assume the proper setting position by that, in making the reflector rim, recourse is had to a molding method in which, by the filling up of certain spaces inside a matrix or gauge, such as a templet, with a mass of material which is plastic under the power of a press at the working temperature, though solidifying subsequently, the exact position of the mirror planes is determined. The method may be practiced either by producing the reflecting surfaces by the material pressed into the matrix and abutting against the walls or else in such a way that the material fixes the mirrors, laid into a templet or gauge by the use of suitable connecting pieces or carriers, in the desired position by the filling up of certain hollow spaces.

Figure 2:
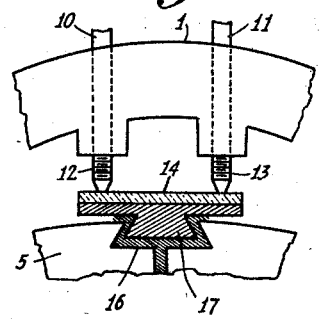

The accompanying drawing serves to illustrate the invention and, as shown by Fig. 1 the plastic material forms the mirror surface, while by Fig. 2 the material serves to support the mirror surfaces.

Referring now to Fig. 1, of the drawing, a part of the circumference of the round steel matrix 1 presenting highly polished surfaces 2, 3, 4, ground onto the inner side thereof, is shown so that their surfaces occupy the exact location of the mirror planes. Laid into the matrix 1 is a metallic wheel rim 5 which is centered upon an axis or shaft. It is suitable to make this part 5 of iron and provide thereon dentation 6 indicated by the dotted line, these teeth serving for the purpose of building and using the interior of the revolving mirror or reflector wheel as a member of a synchronous motor. The rim 5 is provided, for instance, with dove-tail-shaped notches 6, 7, 8, whereby adhesion and union of the mass pressed into the space 9 and molded therein is insured during rapid rotation. The said mass may consist, e. g., of bakelite or some other smooth non-deformable molding material. By the solidification of the mass inside the space 9 the ensuing structure is given highly-polished or reflective surfaces at the places where it is in contact with the polished surfaces 2, 3, 4, and these correspond to the final position of the individual reflector surfaces or planes.

By superficial silver plating, say, by means of cathode disintegration or cathode spattering followed, if necessary, by polishing, these surfaces are given directly the final condition in which the mirror-studed rim is to be used in practice.

In practicing the method as illustrated in Fig. 2 only that part of the circular mold is shown which corresponds to a single mirror. In the pressure-proof rim 1 are fitted setting screws, most suitably four such screws for each mirror, so arranged that the structure forms a jig and so that the several screws come to bear in the neighborhood of the four corners of the mirror. Of these four screws only the two designated by 10 and 11 are illustrated. The bearing surfaces at the ends 12 and 13 are hardened. 14 denotes the glass plate of the mirror firmly cemented upon a planar carrier or support 15, 16 and which is to be silver-plated prior to or after the pressing process. The smooth part 15 has an extension 17 of dove-tail-shape and serving at the same time to reinforce it. The extension 17 engages in a corresponding, though appreciably larger, notch 16 of the wheel rim 5. In other regards, the rim 5 may be made similarly to that of the case illustrated by Fig. 1. In this method the fluid mass to be forced in under pressure, if desired, through holes or bores provided in the rim 5, is introduced merely into the spaces between 16 and 17. As a result the mirror carrier 15, 16, is, piston-fashion, forced outwardly with the result that the mirror 14 comes to bear snugly and firmly against the four set screws of the jig. In this position, the pressing or molding material, for instance, a readily flowing metal alloy, such as that known as Wood's metal, introduced in the presence of moderate heating of the assembly, is allowed to solidify. The material to be employed should most suitably be of such a nature and be so introduced that, during solidification it has a slight tendency to expand in order that it may assume greater mechanical solidity and strength.

In making a Weiller mirror-wheel, i. e. in making the mold according to Fig. 1, the different angles of inclination of the surfaces 2, 3, 4, in relation to the axis of rotation and centering of the wheel must be taken into consideration. In using the method illustrated in Fig. 2, the reflector carriers 15, 16, should preferably be made wedge-shaped or cone-shaped in the direction parallel to the axis and with graduated angles of inclination so that the milled-out portions 16 will all come to be positioned parallel to the axis of rotation. At all events, the cost of expensive matrixes, gauges or setting devices is incurred but once, and it is possible to make great numbers of mirror-wheels therefrom in a uniform manner. The method herein disclosed is applicable also for arrangements comprising non-planar mirrors, such as concave mirrors, upon the circumference of the wheel.

While I have described my invention in two of its preferred forms, it is, of course, apparent that many other modifications are possible and I, therefore, believe that my invention should be considered in its broadest scope and believe myself to be entitled to make and use any and all of the modifications such as fall fairly within the spirit and scope of the invention as set forth in the hereinafter appended claims and such as would suggest themselves to those skilled in the art to which the invention relates.

Having thus described my invention, what I claim is:

1. The method of preparing optical mirror wheels which comprises placing a rim for supporting the mirror surfaces within a jig of a shape and size corresponding to a finished mirror wheel, positioning in the space between the jig and the rim a series of mirror surfaces loosely mounted in predetermined relationship with respect to each other and the rim, and in forcing into the space between the rim and the mirror surfaces a plastic material adapted to expand upon cooling to force the mirror surfaces outwardly against the adjacent jig surface in predetermined position, so that upon cooling of the plastic the mirror surfaces are secured rigidly to the rim.

2. The method of preparing an optical mirror wheel which comprises placing a rim for supporting a series of elements upon the periphery thereof within a jig of predetermined design, loosely placing one of the elements to be supported at predetermined peripheral points on the rim, forcing a heated plastic material adapted to expand upon cooling into the space between the rim and the loosely positioned elements to force each element to move outwardly from the rim to assume a position relative thereto corresponding to the contour of the positioning jig so that upon hardening the plastic material maintains the elements rigidly fixed in the position relative to the rim established by the jig.

FRITZ SCHRÖTER.